(12) United States Patent
Burdick

(10) Patent No.: US 8,505,947 B2
(45) Date of Patent: Aug. 13, 2013

(54) SINGLE-SPEED BICYCLE CONVERSION APPARATUS, METHODS, AND KITS

(76) Inventor: Christopher L. Burdick, Dallas, TX (US)

( * ) Notice: Subject to any disclaimer, the term of this patent is extended or adjusted under 35 U.S.C. 154(b) by 435 days.

(21) Appl. No.: 12/763,776

(22) Filed: Apr. 20, 2010

(65) Prior Publication Data

US 2010/0295265 A1 Nov. 25, 2010

Related U.S. Application Data

(60) Provisional application No. 61/179,491, filed on May 19, 2009.

(51) Int. Cl.
*B62M 9/02* (2006.01)

(52) U.S. Cl.
USPC .......................... 280/259; 280/260; 301/110.5

(58) Field of Classification Search
USPC ............... 280/259, 260, 261; 474/160, 152, 474/165, 902, 903; 311/6.5, 110.5; 403/261; 24/19; 301/6.5, 110.5; 192/64, 46
See application file for complete search history.

(56) References Cited

U.S. PATENT DOCUMENTS

| | | | | |
|---|---|---|---|---|
| 1,519,236 A * | 12/1924 | Bernier | ......................... | 403/261 |
| 4,019,824 A * | 4/1977 | Percy | ............................ | 403/261 |
| 4,631,974 A * | 12/1986 | Wiegand et al. | ................ | 74/450 |
| 5,035,681 A * | 7/1991 | Hertel et al. | ................... | 474/152 |
| 5,052,842 A * | 10/1991 | Janatka | ............................ | 403/14 |
| 5,389,044 A * | 2/1995 | Bandy et al. | ..................... | 474/96 |
| 5,947,265 A * | 9/1999 | Merten et al. | ................. | 198/834 |
| 6,263,759 B1 | 7/2001 | Hollingsworth | | |
| 6,659,895 B2 | 12/2003 | Fukuda | | |
| 7,108,097 B1 | 9/2006 | Bolton | | |
| 2002/0070604 A1 | 6/2002 | Kanehisa | | |
| 2004/0147348 A1* | 7/2004 | Yiu et al. | ........................ | 474/95 |
| 2006/0040776 A1* | 2/2006 | Hansen | ......................... | 474/160 |
| 2007/0254758 A1 | 11/2007 | Chen | | |
| 2007/0293361 A1* | 12/2007 | Young | ........................... | 474/152 |
| 2008/0058144 A1* | 3/2008 | Oseto et al. | ................... | 474/160 |
| 2010/0099530 A1* | 4/2010 | Chiang et al. | ................ | 474/160 |
| 2010/0244437 A1* | 9/2010 | O'Neil et al. | ................. | 285/104 |

OTHER PUBLICATIONS

Amazon.com, "Wheels Manufacturing Single Speed Conversion Kit." Internet. Last visited Apr. 1, 2009 and believed to be prior art.
Pricepoint.com, "Gusset 1-ER Single Speed Conversion Kit." Internet. Last visited Apr. 1, 2009 and believed to be prior art.

* cited by examiner

*Primary Examiner* — Anne Marie M Boehler
(74) *Attorney, Agent, or Firm* — PatentBest; Andrew McAleavey

(57) ABSTRACT

Methods, apparatus, and kits for converting multiple speed bicycles to single speed are disclosed. The methods include removing a cassette of gears from the hub of a bicycle gear and installing a single gear between two clamps that are releasably secured to the hub. In some embodiments, the clamps may be split-ring clamps with ends that are connected by a fastener. Kits according to embodiments of the invention may include a gear and one or more clamps.

8 Claims, 4 Drawing Sheets

SINGLE-SPEED BICYCLE CONVERSION APPARATUS, METHODS, AND KITS

CROSS-REFERENCE TO RELATED APPLICATIONS

This application claims priority to U.S. Provisional Patent Application No. 61/179,491, filed May 19, 2009, the contents of which are incorporated by reference herein in their entirety.

BACKGROUND OF THE INVENTION

1. Field of the Invention

Generally speaking, the invention relates to bicycles, and more particularly, to apparatus, methods, and kits for single-speed bicycle conversion.

2. Description of Related Art

Bicycles are two-wheeled, human-powered land vehicles that use a chain and sprocket drive train to transmit power between a pedal-actuated crank and a driven wheel. Many bicycles are "multiple speed" in that they have sets of closely spaced sprockets or gears coupled to the driven wheel and a mechanism, such as a derailleur, for moving the chain between the various gears. The variable gearing ratios provided by the multiple, selectable gears allow the bicyclist to pedal at a comfortable, efficient speed while the driven wheel moves at a corresponding speed that can be adapted to suit the terrain.

Some bicycles are "single speed" in that they have only one sprocket or gear on the driven wheel, and thus, do not provide a variable gearing ratio. Single speed bicycles often require more work or effort from the cyclist, who must pedal without the assistance of variable gearing ratios. However, single speed bicycles have become particularly popular among some enthusiasts, who value them for their simplicity and fitness potential.

Although dedicated single speed bicycles are made and sold, one of the least expensive options for obtaining a single speed bicycle is to convert an existing multiple speed bicycle to single speed. To do so, one removes the set or "cassette" of sprockets or gears that are connected to the hub of the driven wheel and replaces that set of gears with a single gear. Traditionally, this process is performed using a single speed conversion kit that includes a gear and a number of spacers. The spacers slide onto the hub on either side of the gear, and the kit usually includes some sort of locking mechanism to lock spacers and gear onto the hub. Once in position, the spacers define the lateral position of the gear along the hub and help to retain it in that position.

There are several notable disadvantages to the use of the traditional single speed conversion kits described above. First, the lateral position of the gear on the hub can only be set in increments defined by the width of the spacers—it cannot be positioned at an arbitrary location on the hub. Second, the kits are cumbersome with their multiple parts. Third, once the gear is installed, the user may find that the position of the gear should be changed slightly for optimum chain alignment. In that case, the user must disassemble the wheel assembly, remove all of the spacers, and begin again.

SUMMARY OF THE INVENTION

One aspect of the invention relates to a method for converting a multi-speed bicycle to single speed. The method comprises removing a set of gears from a hub of a bicycle wheel, and securing a single gear on the hub between two clamps. The clamps are releasably and adjustably secured to the hub. The method may further comprise adjusting the position of the single gear on the hub by at least partially releasing the clamps, shifting the position of the clamps and the gear on the hub, and securing the clamps to the hub.

Another aspect of the invention relates to a kit for converting a multi-speed bicycle to single speed. The kit comprises at least two split-ring clamps. Each of the split-ring clamps has ends connected with an adjustable fastener. The clamps are sized and adapted to be secured to the hub of the bicycle wheel.

Yet another aspect of the invention relates to a bicycle. The bicycle comprises a frame, a front wheel, a rear wheel, and a drivetrain. The drivetrain includes a crank connected to the frame. The crank includes crank arms connected to pedals. A single gear is secured between two clamps on a hub of the rear wheel. Each of the clamps is releasably secured to the hub. An endless chain engages the crank and the single gear so as to place the rear wheel in a driven relationship with the crank.

Broader aspects of the invention relate to methods and apparatus for securing items to the hub of a bicycle. In some embodiments, two or more gears may be secured on a bicycle hub between two split-ring clamps. In other embodiments, a cassette may be secured to a bicycle hub using a single clamp.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the views, and in which.

DETAILED DESCRIPTION

Figure 1:
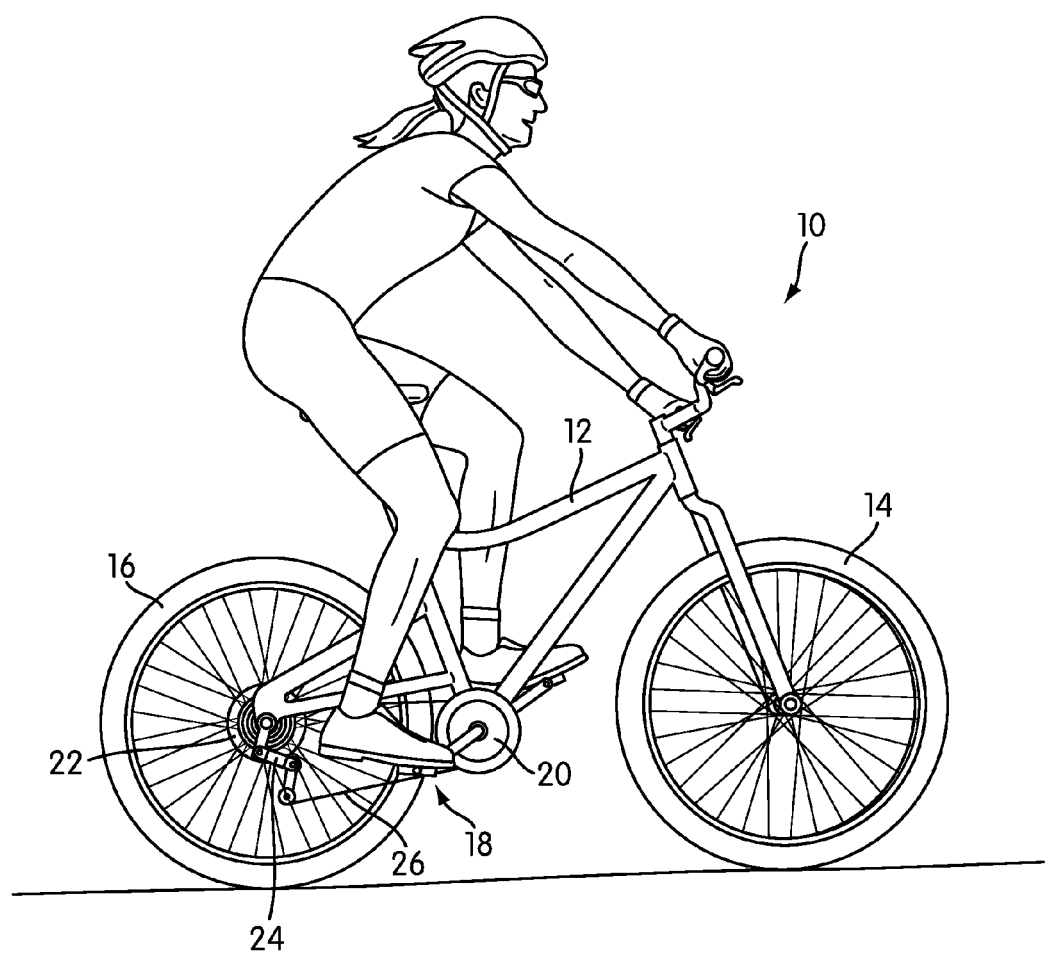
FIG. 1 is a side elevational view of a multi-speed bicycle.

FIG. 1 is a side elevational view of a multi-speed bicycle, generally indicated at 10. The bicycle 10 includes a frame 12, and front and rear wheels 14, 16 connected to the frame 12. The bicycle 10 of FIG. 1 also has a conventional multi-speed chain and sprocket drive train, generally indicated at 18, to transfer power between a pedal-driven crank assembly 20 and the rear wheel 16, making the rear wheel 16 the driven wheel.

As shown in FIG. 1, the rear wheel 16 has a set or cassette 22 of closely-spaced gears, and a derailleur 24 that shifts the chain 26 between the gears in the cassette. (In the following description, the terms "gear" and "sprocket" are used interchangeably.) Thus, the rider pedals to drive the rear wheel 16, and the variable gear ratio provided by the gears in the rear-wheel cassette 22, and optionally, gears coupled to the crank assembly 20, allow the rider to pedal at a relatively constant speed while the rear wheel 16 is driven more quickly or more slowly.

Figure 2:
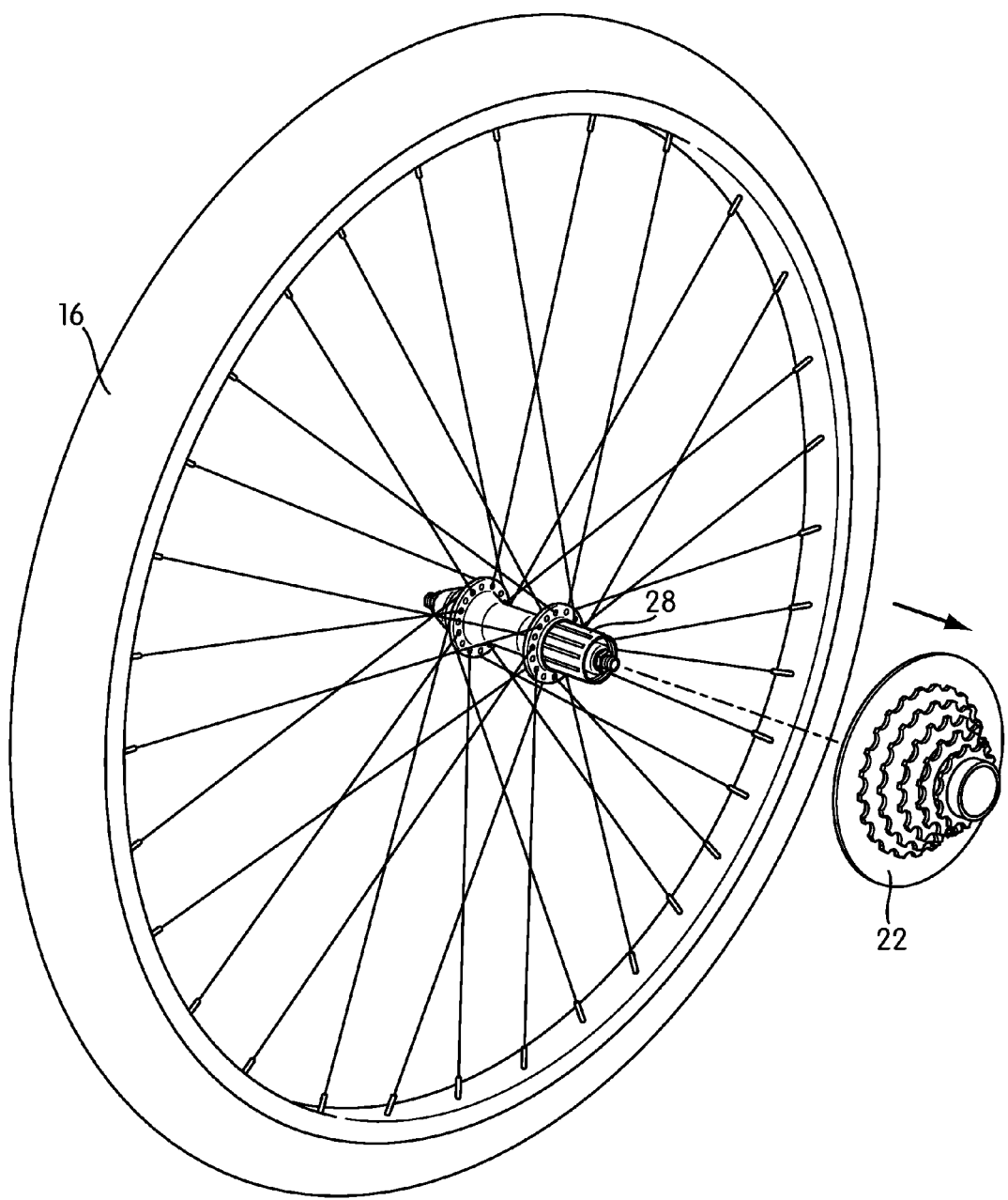
FIG. 2 is an exploded perspective view of the driven wheel of the bicycle of FIG. 1, illustrating the removal of the cassette of gears coupled to the wheel.

In embodiments of the invention, multi-speed bicycles like bicycle 10 are converted to single speed. Methods of doing so may vary from bicycle to bicycle, and generally involve removing the rear wheel 16 from the bicycle 10 and removing the cassette of gears 22 from the wheel 16 to expose the hub 28, as is shown in the exploded perspective view of FIG. 2, which illustrates a rear wheel 16 in isolation. To do so, one generally disengages the chain 26 from the cassette 22, and releases the quick-release skewer (not shown in FIG. 2) that connects the wheel to the frame 12.

The process of removing the cassette 22 from the hub 28 is also known in the art and may vary from bicycle to bicycle. Generally, it involves using a chain whip tool to hold the cassette 22 steady against rotation while removing the nut that secures it to the hub.

Figure 3:
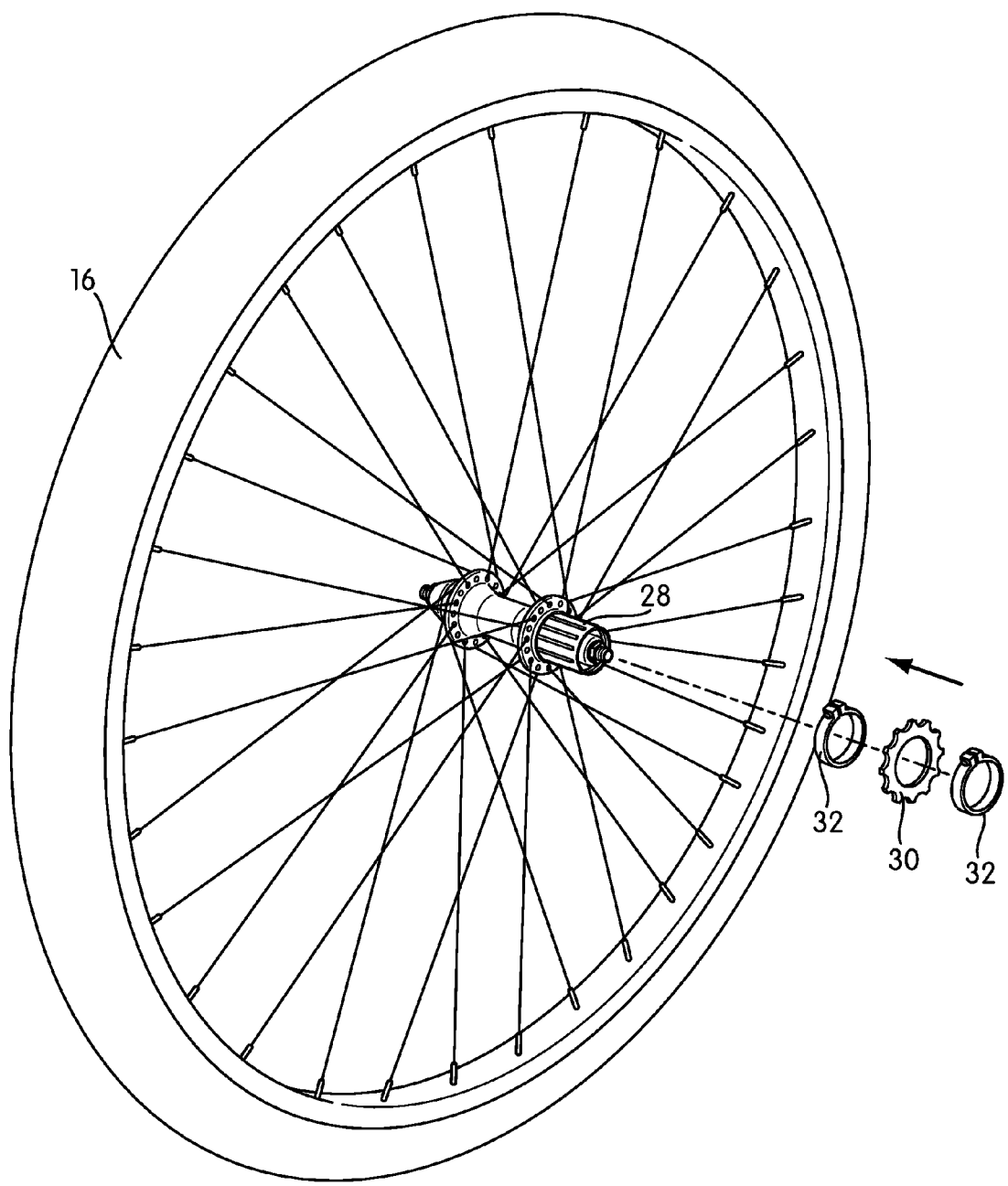
FIG. 3 is an exploded perspective view of the installation of a single speed conversion kit according to an embodiment of the invention.
Figure 4:
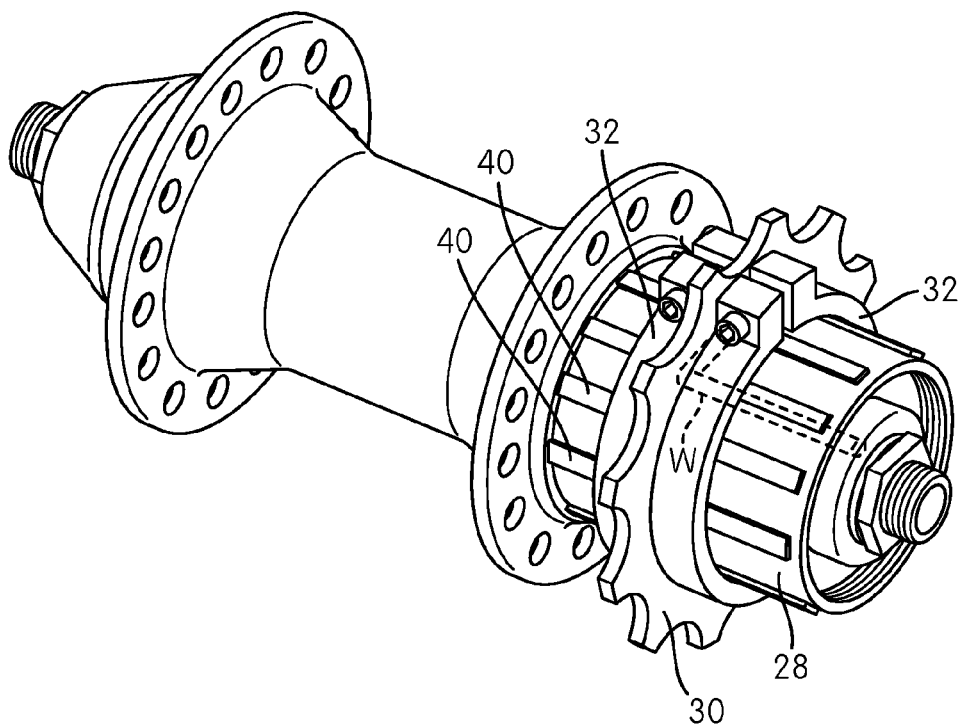
FIG. 4 is a perspective view of the hub of the bicycle of FIG. 1 with the kit of FIG. 3 installed.
Figure 5:
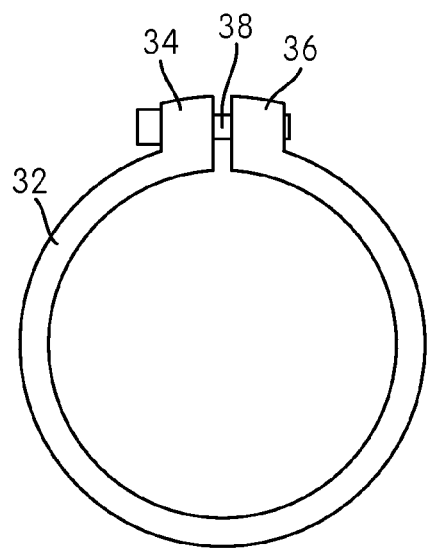
FIG. 5 is a front elevational view of a clamp used in the kit.

Once the cassette 22 has been removed to expose the hub 28, a single gear 30 is secured between two clamps on the hub, as is shown generally in the exploded perspective view of FIG. 3. FIG. 4 is a perspective view of the hub 28 in isolation with the gear 30 installed between the two clamps 32, and FIG. 5 is a front elevational view of one of the clamps 32.

In embodiments of the invention, any kind of clamp that can be secured to the hub 28 may be used. As shown in FIGS. 3-5, the clamps 32 are split-ring clamps in which the two ends 34, 36 are connected by a fastener 38 that passes through appropriately sized holes in each end 34, 36. Depending on the embodiment, the holes in the ends 34, 36 through which the fastener 38 passes may be tapped or untapped, although if the holes are untapped, then the fastener 38 may be secured in place by a nut.

Because the fastener 38 is arranged between the two ends 34, 36, when the fastener 38 is turned, for example by the Allen wrench W shown in phantom in FIG. 4, the movement of the fastener 38 draws the two ends 34, 36 closer together or moves them farther apart, changing the inner diameter of the clamp 32 and either securing it to or releasing it from the hub 28. In some embodiments, the ends 34, 36 of the clamp 32 may be counterbored or countersunk to allow the head of the fastener 38 to be held either within the clamp 32 or flush with its surface.

Although the fastener 38 is a screw-type fastener, the ends 34, 36 may be brought together by any suitable mechanism, including lever-type quick-release arrangements.

With the arrangement shown in FIG. 4, each clamp 32 is secured directly to the hub 28 with the gear 30 between them. The position of the clamps 32 defines the lateral position of the gear 30 on the hub 28, and the gear 30 can be positioned substantially anywhere on the hub 28 without the need for spacers to maintain its lateral position. Moreover, the gear 30 can be repositioned on the hub 28 by turning the fasteners 38 to loosen the clamps 32 and sliding the assembly on the hub 28. The gear 30 itself has an inner diameter that is adapted to engage ridges 40 or other complementary engaging structure on the hub 28, such that when the gear 30 turns, the hub 28 turns.

Figure 6:
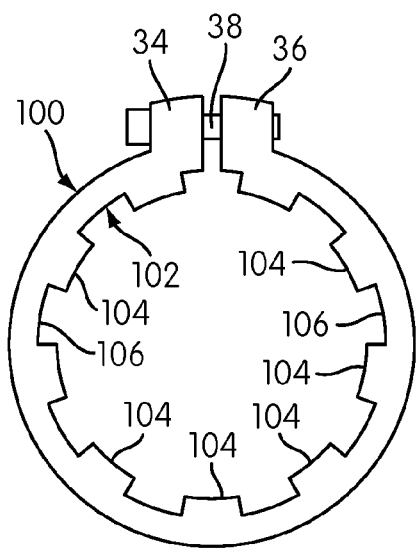
FIG. 6 is a side elevational view of a clamp according to another embodiment of the invention.

In some embodiments, the inner circumferences of the clamps 32 may be adapted, structured, or modified to match the engaging structure on the hub 28, so as to engage the hub 28 more securely. For example, FIG. 6 is a side elevational view of a clamp, generally indicated at 100, according to another embodiment of the invention. The clamp 100 is generally similar to the clamp 32 described above; however, the inner circumference 102 of the clamp 100 has an alternating pattern of depressions 106 and teeth 104 that match the spacing and depth of the ridges 40 on the hub 28. The pattern, spacing, and configuration of the teeth 104 and depressions 106 will vary depending on the characteristics of the hub 28 with which the clamp 100 is intended to be used.

The use of methods and structures according to embodiments of the present invention has certain advantages. First, the gear 30 may be placed in any lateral position on the hub 28, which may help to ensure proper alignment of the chain 26 between the crank assembly 20 and the gear 30. This is in contrast to the traditional spacer-based conversion methods and kits, using which the gear can only be placed in locations that are multiples of the widths of the spacers.

Second, if the gear 30 is misaligned after the rear wheel 16 has been attached to the frame 12, it can be easily realigned without removing the wheel 16 from the frame 12 by loosening the clamps 32 and moving the gear 30. This avoids the problem of having to remove the rear wheel 16 from the frame 12 multiple times during the process to adjust alignment.

Third, the gear-and-clamp assembly of FIGS. 3-6 may be lighter than the conventional single speed conversion kits. The clamps 32 themselves may be made of a metal, such as aluminum, a plastic, or any material with sufficient strength. In different embodiments, the clamps 32 may be of different sizes to fit different kinds of hubs. In one embodiment, for example, the clamps 32 may be sized and otherwise adapted to fit a Shimano-compatible free hub. The clamps 32 may also be anodized or otherwise surface modified to increase weather and environmental resistance and, if desired, for decorative effect.

Additionally, the gear-and-clamp assembly of FIGS. 3-6 allows riders to use multiple gears, for example, to choose gears with particular sizes and tooth numbers for particular rides. These single gears may be easily swapped out by loosening one of the clamps 32 and removing it from the hub 28.

As was described above, aspects of the invention also relate to kits for converting multi-speed bicycles to single speed. The kits may include two or more clamps 32 and may also include a tool, such as an Allen wrench, for loosening and tightening the clamps 32. Kits according to embodiments of the invention may also include one or more gears. If a kit includes multiple gears, each may have different characteristics.

Although the description above focuses on conversion of a multiple speed bicycle to single speed, the invention need not be confined to that purpose. In some embodiments, clamps 32 and kits according to embodiments of the invention may be used to install one or more gears on the hub of a new bicycle.

Additionally, as those of skill in the art will realize, the clamps 32 may be used more generally to secure a variety of structures to the hub of a bicycle and, as was noted above, aspects of the invention pertain more generally to attaching structures to bicycle hubs. In one embodiment, more than one gear may be secured to the bicycle using clamps. For example, a user may choose to secure two gears between a pair of clamps 32, and may move the bicycle chain between those gears manually, without the use of a derailleur. Depending on the embodiment and the characteristics of the gears, a spacer may or may not be used between the two gears. In particular, if the gears are constructed such that they are thicker toward their center and narrow toward their teeth, a spacer between the gears may not be necessary. This sort of arrangement would allow the user the benefits of single speed bicycling, but would also allow the user some flexibility in changing gears if necessary or desired.

In other embodiments, a single clamp 32 may be used to secure a cassette of gears to a hub, an arrangement that would allow the cassette to be removed and replaced easily.

While the invention has been described with respect to certain exemplary embodiments, the embodiments are intended to be exemplary, rather than limiting. Modifications and changes may be made within the scope of the invention, which is defined by the appended claims.

What is claimed is:

1. A method for converting a multi-speed bicycle to single speed, comprising:

removing a cassette of gears from a hub of a bicycle wheel, the hub being sized and adapted to accommodate the cassette of gears; and securing a single gear on the hub between two clamps in a position previously occupied by the cassette of gears, the clamps being releasably and adjustably secured to the hub;

wherein the single gear is positioned between the two clamps such that it is in substantial alignment with, receives, and is driven by a chain of the bicycle's drive train.

2. The method of claim 1, further comprising adjusting the position of the single gear on the hub by at least partially releasing the clamps;

shifting the position of the clamps and gear on the hub; and securing the clamps to the hub.

3. The method of claim 1, wherein each of the clamps comprises a split-ring clamp having ends connected by an adjustable fastener.

4. The method of claim 1, wherein, as secured by the two clamps, the single gear is in at least substantial alignment with a driving gear coupled to a crank assembly on the bicycle.

5. The method of claim 1, wherein each of the two clamps has an interior circumference with engaging structure that matches hub engaging structure provided on the hub.

6. The method of claim 5, wherein the engaging structure comprises a set of teeth arrayed around the interior circumference.

7. The method of claim 1, wherein the two clamps maintain the lateral position of the gear on the hub without spacers.

8. The method of claim 1, further comprising securing a second gear between the two clamps on the hub.

* * * * *